3,317,352
METHOD FOR DETERMINING THE STATE OF CHARGE OF BATTERIES BY THE USE OF TRACERS
James E. Webb, Administrator of the National Aeronautics and Space Administration, with respect to an invention of George M. Arcand, Tujunga, Calif.
No Drawing. Filed Feb. 5, 1965, Ser. No. 430,778
6 Claims. (Cl. 136—182)

The invention described herein was made in the performance of work under a NASA contract and is subject to the provision of Section 305 of the National Aeronautics and Space Act of 1958, Public Law 85-568 (72 Stat. 495; 42 U.S.C. 2457).

This invention pertains to the method for determining the state of charge of alkali batteries by the use of tracers. More particularly, this invention relates to electrochemical batteries and to the use therein of tritium-containing electrolyte solutions, the concentration of the tritium in the electrolyte undergoing change upon discharge and/or charge in accordance with certain chemical reactions taking place within the electrodes.

It is known that alkali batteries do not possess a single attribute which will permit the determination of the state of charge of the cell either during charge, storage or discharge. In lead-acid batteries the specific gravity of the electrolyte is used as the state-of-charge indicator. In the alkali battery there is, however, little or no change in the specific gravity of the electrolyte so that gravimetric tests will not serve the intended purpose.

According to the present invention it has been found that tritiated hydrogen (heavy hydrogen having an atomic weight of three) may be used as the tracer in the electrolyte of an alkali battery. During discharge of the alkali batteries some of the tritium is deposited on the electrodes of the battery. By the use of a scintillation counter, the relative concentration of undeposited tritium in the electrolyte can be determined at any time and hence, the state of charge of the battery.

It is an object of this invention to provide a simple means for determining the state of charge of an alkali battery.

Still another object of this invention is the use of tritium as a tracer in the electrolyte solution of an alkali battery as a means of measuring the state of charge of the battery.

A further object of this invention is the use of liquid scintillation counter equipment to determine the amount of undeposited tritium in an alkali battery.

These and other objects of this invention will be apparent from the detailed description which follows.

The lead-acid storage battery is, of course, well known. Still another much-used type of storage battery is the alkali battery. The alkali battery uses an alkali metal hydroxide rather than an acid as the electrolyte. These alkali batteries have many uses in research laboratories, in power units and as starting batteries for diesel-powered trucks, buses, locomotives and boats. In contrast to the lead-acid battery, the original cost of alkali batteries is high. This factor is offset to a considerable extent by the fact that the alkali batteries generally have longer life than ordinary lead-acid batteries. However, as indicated above, previously no ready and dependable way of determining the state of charge of these batteries has been available. The present method utilizes tracer techniques employing tritium as will hereinafter be more fully explained.

The present invention has particular application to alkali batteries having a nickel positive plate and a cadmium negative plate. However, the invention is also applicable to silver-cadmium, silver-zinc batteries, and other alkali batteries. To understand the invention, it will be first necessary to describe the general construction of the alkali battery. The nickel-cadmium battery will be discussed for illustration purposes. In this battery the positive and negative plates are usually similar in construction, consisting of perforated pockets which contain the active materials. The pockets for both positive and negative plates are usually made from perforated steel ribbon which has been nickel-plated and annealed in hydrogen. Provision must normally be made for expansion of the positive active materials within the pockets.

In the preparation of the battery, the pockets of the positive plates are filled with carefully prepared nickel hydroxide filled with flaked nickel or flaked natural graphite. The pockets of the negative plates are filled with cadmium hydroxide or, in some cases, a mixture of cadmium hydroxide and finely divided iron or iron oxide in an amount up to 30% by weight. The nickel hydroxide is normally prepared by precipitation from solutions of nickel sulphate. This precipitate comes down as a fine dispersion with strong absorptive properties. The precipitate may then be treated with caustic solution and dried. The nickel content of the final product is usually less than about 63%.

The pockets for holding the active material of both positive and negative plates are normally pressed into grids or frames made of nickel-plated steel. The plates are assembled into elements, rods of polystyrene being used as separators between plates, and rubber separators between the assembled unit and the inside surface of the steel container of the battery. The container is welded along all seams.

After the plates are constructed and assembled, the unit is connected to a battery charger which reduces the cadmium oxide at the negative plate to spongy cadmium metal and oxidizes the nickel of the nickel hydroxide to the nickel oxide of the formula NiO(OH). The electrolyte is normally a solution of an alkali hydroxide such as potassium hydroxide generally having a specific gravity of from about 1.15 to about 1.25. In some cases mixed hydroxides such as a mixture of potassium hydroxide and lithium hydroxide are used. In the present invention at least some of the hydrogen in the electrolyte solution is in the form of tritium. The tritium may be introduced in the form of tritiated alkali metal hydroxide, or in the form of tritiated water since at least some interchange between the hydroxyl groups of the alkali metal hydroxide and the water has been found to occur. In any event, the amount of tritium present initially will depend on the size of the battery, but should be sufficient so that the amount remaining after battery discharge can be detected using conventional scintillation counter equipment. Generally, the initial amount of tritium varies from about 50 to about 10,000μ curies.

The utility of the tritium in determining the state of charge of the battery will be more apparent from a consideration of the half-reactions of the nickel-cadmium battery as follows:

(I) $Cd + 2(OH)^- \rightarrow Cd(OH)_2 + 2e^-$ (anode reaction)
(II) $2NiO(OH) + 2H_2O + 2e^- \rightarrow$
$\qquad 2Ni(OH)_2 + 2(OH)^-$ (cathode reaction)

According to these equations, hydroxide groups are continuously removed from the electrolyte solution and deposited on the anode in the form of cadmium hydroxide. Meanwhile, at the cathode, the reaction produces hydroxide groups and also results in the taking up of one hydrogen atom per mole of NiO(OH) converted to Ni(OH)$_2$.

It is apparent that the amount of $(OH)^-$ in the electrolyte will remain constant since as much is produced by the cathodic reaction as is used in the anodic reaction. However, the anodic removal of $(OH)^-$ can be used as an indication of the extent of the reaction and therefore the state of charge if the $(OH)^-$ ion is tagged with tritium.

Thus, consider the condition in which the hydrogen-containing species are tagged with tritium, designated as $H^*$. Then the half reactions of the nickel-cadmium cell may be written as follows:

(III) $Cd + 2(OH^*)^- \rightarrow Cd(OH^*)_2 + 2e^-$
(IV) $2NiO(OH^*) + 2H_2{^*}O + 2e^- \rightarrow 2Ni(OH^*)_2 + 2(OH^*)^-$ It can be seen that at the negative plate the cadmium loses electrons and reacts with the hydroxide carrying the tagged hydrogen to form cadmium hydroxide, the cadmium hydroxide effectively removing tagged hydrogen from solution. At the positive plate, the $NiO(OH^*)$ reacts with water and gains electrons to form $Ni(OH^*)_2$ and hydroxide ions. The foregoing equations indicate qualitatively that as the battery discharges, the amount of tritiated hydrogen in solution will be decreased.

I am not certain as to the rate at which the tritium is removed during discharge, and therefore, this must be determined empirically for a battery of given size and initial tritium content. Theoretically, the amount of tritiated hydrogen removed as the battery discharges depends upon whether only the alkali metal hydroxide is tagged, or whether there is a rapid exchange between water and the hydroxide ion. If the former condition is assumed, then the reaction at the cathode may be written as follows:

(V) $2NiO(OH^*) + 2H_2O + 2e^- \rightarrow 2NiO(OH^*)(OH) + 2(OH)^-$

Assuming that there is no exchange with water, the anodic and cathodic reactions result in a net decrease of tagged $(OH)^-$ in solution. From elementary considerations it will be seen that this decrease in the amount of tagged $(OH)^-$ in solution after any given amount of reaction, i.e., discharge, may be defined by the following differential equation.

(VI) $$-d(OH^*)^- = \frac{(OH^*)^-}{(OH)^-} dq$$

wherein:
$(OH^*)^-$ equals the number of moles of tritium-containing hydroxide;
$d(OH^*)^-$ equals the increment in the number of moles of tritium-containing hydroxide;
$(OH)^-$ is constant and equals the total number of moles of hydroxide; and
$dq$ equals an increment of reaction in equivalents.

The foregoing differential equation upon rearrangement and integration may be written as follows:

(VII) $$\log_{10} \frac{(OH^*)^-}{(OH^*)_o^-} = -\frac{q}{2.3(OH)^-}$$

where $(OH^*)_o^-$ is the initial number of equivalents of tagged hydroxide, that is, the number of equivalents of tagged hydroxide when the battery is in a fully charged condition. It is apparent from Equation VII that the amount of tritiated hydroxide in the electrolyte solution decreases as the battery discharges.

If it is assumed, on the other hand, that there is a rapid exchange of tritiated hydrogen between water and the hydroxide as the experimental evidence suggests, there will nevertheless be a removal of tagged hydrogen at the rate of one equivalent per equivalent of electricity at the cathode as shown by Equation IV. Thus, regardless of the particular mechanism postulated, there results a removal of tagged hydrogen from the electrolyte solution as the battery discharges.

The following example is presented solely to illustrate the invention and should not be regarded as limiting in any way. In the examples, parts and percentages are by weight unless otherwise indicated.

*Example I*

A nickel-cadmium cell containing a cathode and an anode prepared as indicated above and containing 30 milliliters of 6.5 molar potassium hydroxide electrolyte solution is prepared. This cell has a capacity of about 7 ampere hours. The amount of tritium in the electrolyte initially is sufficient to correspond to a radioactivity of about $60\mu$ curies. This battery is connected to an external load and permitted to discharge. As the battery discharges, the amount of tritium in the electrolyte is periodically measured and found to be decreased as indicated by the reduction in the number of disintegrations per minute detected in a representative sample of the electrolyte solution by a previously calibrated liquid scintillation counter.

In order to accurately correlate the degree of charge with the amount of tritium in a given battery electrolyte, it is only necessary to calibrate a conventional scintillation counter for a battery of given size and initial tritium content. A microprobe attached to this device and adapted to receive from about 0.25 to about 0.5 milliliter of electrolyte solution is generally adequate. No radiation shielding is required in batteries of ordinary size since the radiation is in the form of low-energy beta rays.

Having fully described the invention, it is intended that it be limited only by the lawful scope of the appended claims.

I claim:

1. The method of ascertaining the state of charge of an electrochemical battery having at least one anode and at least one cathode wetted by an alkali hydroxide-containing electrolyte solution, wherein at least some of the hydrogen atoms in the electrolyte solution are in the form of tritium, which comprises measuring the decrease in the amount of tritium present in the electrolyte solution from the amount present when the battery is fully charged.

2. The method of ascertaining the state of charge of an electrochemical battery having at least one cadmium-containing anode and at least one nickel-containing cathode wetted by an alkali hydroxide-containing electrolyte solution, wherein at least some of the hydrogen atoms in the electrolyte solution are in the form of tritium, which comprises measuring the decrease in the amount of tritium present in the electrolyte solution from the amount present when the battery is fully charged.

3. The method of ascertaining the state of charge of an electrochemical battery having at least one cadmium-containing anode and at least one nickel-containing cathode wetted by a potassium hydroxide-containing electrolyte solution, wherein at least some of the hydrogen atoms in the electrolyte solution are in the form of tritium, which comprises measuring the decrease in the amount of tritium present in the electrolyte solution from the amount present when the battery is fully charged.

4. In an electrochemical battery having at least one anode and at least one cathode wetted by an alkali hydroxide-containing electrolyte solution, the improvement wherein at least some of the hydrogen atoms in the electrolyte solution are in the form of tritium, the amount of tritium in said electrolyte solution being sufficient so that after discharge of the battery, the amount of tritium remaining is capable of detection with conventional scintillation counter-equipment.

5. In an electrochemical battery having at least one cadmium-containing anode and at least one nickel-containing cathode wetted by an alkali hydroxide-containing electrolyte solution, the improvement wherein at least some of the hydrogen atoms in the electrolyte solution are in the form of tritium, the amount of tritium in said electrolyte solution being sufficient so that after discharge of the battery, the amount of tritium remaining is capable of detection with conventional scintillation counter-equipment.

6. In an electrochemical battery having at least one cadmium-containing anode and at least one nickel-containing cathode wetted by a potassium hydroxide-containing electrolyte solution, the improvement wherein at least some of the hydrogen atoms in the electrolyte solution are in the form of tritium, the amount of tritium in said electrolyte solution varying from about 50 to about 10,000µ curies.

References Cited by the Examiner

UNITED STATES PATENTS

| | | | |
|---|---|---|---|
| 2,945,127 | 7/1960 | Hanson | 250—43.5 |
| 2,988,590 | 6/1961 | Andre | 136—182 |
| 2,999,162 | 9/1961 | Fearon | 250—83.6 |
| 3,255,046 | 6/1966 | Ghormley | 136—86 |

WINSTON A. DOUGLAS, *Primary Examiner.*

ALLEN B. CURTIS, *Examiner.*

D. L. WALTON, *Assistant Examiner.*